US010744879B2

(12) United States Patent
Campbell

(10) Patent No.: US 10,744,879 B2
(45) Date of Patent: Aug. 18, 2020

(54) SYSTEMS, METHODS, AND APPARATUS FOR ESTIMATING TORQUE DURING FAULT CONDITIONS

(71) Applicant: Faraday & Future Inc., Gardena, CA (US)

(72) Inventor: Mengwei Li Campbell, Torrance, CA (US)

(73) Assignee: Faraday & Future Inc., Gardena, CA (US)

( * ) Notice: Subject to any disclaimer, the term of this patent is extended or adjusted under 35 U.S.C. 154(b) by 0 days.

(21) Appl. No.: 16/044,400

(22) Filed: Jul. 24, 2018

(65) Prior Publication Data

US 2020/0031233 A1    Jan. 30, 2020

(51) Int. Cl.
*B60L 3/00* (2019.01)
*B60L 3/12* (2006.01)
*B60L 15/20* (2006.01)

(52) U.S. Cl.
CPC .............. *B60L 3/0061* (2013.01); *B60L 3/12* (2013.01); *B60L 15/20* (2013.01); *B60L 2240/423* (2013.01)

(58) Field of Classification Search
CPC .. B60L 2240/423; B60L 15/20; B60L 3/0061; B60L 2240/526; B60L 3/0023; B60L 3/12; H02P 21/20; H02P 29/0241; H02P 6/12
See application file for complete search history.

(56) References Cited

U.S. PATENT DOCUMENTS

| 8,264,190 | B2* | 9/2012 | Suzuki | H02P 29/032 |
| | | | | 318/724 |
| 8,981,704 | B2* | 3/2015 | Endo | B62D 5/046 |
| | | | | 318/400.01 |
| 9,543,879 | B2* | 1/2017 | Toliyat | H02P 25/22 |
| 10,027,263 | B2* | 7/2018 | Toens | H02P 6/12 |
| 10,097,129 | B2* | 10/2018 | Koseki | H02P 27/06 |
| 2014/0009093 | A1* | 1/2014 | Suzuki | H02P 25/22 |
| | | | | 318/400.02 |
| 2014/0246999 | A1* | 9/2014 | Kezobo | H02P 29/032 |
| | | | | 318/400.23 |
| 2017/0070178 | A1* | 3/2017 | Koseki | H02P 27/06 |

* cited by examiner

*Primary Examiner* — Thai T Dinh
(74) *Attorney, Agent, or Firm* — Knobbe, Martens, Olson & Bear, LLP

(57) ABSTRACT

The present disclosure generally relates to operating an electric vehicle (EV) during a fault condition. The EV drive system comprises a motor configured to provide motive force to the EV. The EV processing system can to run a diagnostic routine to monitor the drive system for the fault condition. In response to identifying that the drive system is in the fault condition, the processing system can determine whether the fault condition was caused a three-phase short circuit or a three-phase open circuit. The processing system can estimate a motor torque for the motor based at least partly on the motor speed and on whether the fault condition was caused by the three-phase short circuit or the three-phase open circuit, and can use the estimated motor torque to control the drive system to provide motive force to the EV while operating in the fault condition.

20 Claims, 5 Drawing Sheets

SYSTEMS, METHODS, AND APPARATUS FOR ESTIMATING TORQUE DURING FAULT CONDITIONS

BACKGROUND

Field

The present application relates generally to electric vehicle fault condition reactions, and more specifically to systems, methods, and apparatus for identifying fault conditions and performing torque estimation during the fault conditions in electric motors.

Background

In many electric vehicle systems, various fault conditions may occur when one or more components of electric vehicle systems are not functioning properly. In some scenarios, a fault condition may occur as a result of a hardware fault, software fault, mechanical overload, and/or accident, or various other events. Some fault conditions may result in a hazardous state or response by one or more components of the electric vehicle. For example, a fault in the drive system of the electric vehicle may cause one or more systems of the vehicle to shut down while the electric vehicle is in motion, which may create a hazardous state for the electric vehicle and its occupants or neighboring objects.

SUMMARY

Various implementations of systems, methods and devices within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

A first aspect discloses an apparatus for operation of an electric vehicle (EV) during a fault condition. The apparatus comprises a drive system comprising a motor configured to provide motive force to the EV and a processing system. The processing system is configured to run a diagnostic routine to monitor the drive system for the fault condition and, based on a result of the diagnostic routine, identify that the drive system is in the fault condition. In response to identifying that the drive system is in the fault condition, the processing system is configured to determine a motor speed of the motor that caused the fault condition and determine whether the fault condition caused a three-phase short circuit or a three-phase open circuit. The processing system is further configured to, in response to identifying that the drive system is in the fault condition, estimate a motor torque for the motor that caused the fault condition based at least partly on the motor speed and on whether the fault condition caused the three-phase short circuit or the three-phase open circuit and use the estimated motor torque to control the drive system to provide motive force to the EV while operating in the fault condition.

In another aspect, a method of operating an electric vehicle (EV) during a fault condition is disclosed. The method comprises running a diagnostic routine to monitor a drive system for the fault condition, the drive system comprising a motor configured to provide motive force to the EV and, based on a result of the diagnostic routine, identifying that the drive system is in the fault condition. The method further comprises, in response to identifying that the drive system is in the fault condition, determining a motor speed of the motor and determining whether the fault condition caused a three-phase short circuit or a three-phase open circuit. Also in response to identifying that the drive system is in the fault condition, the method comprises estimating a motor torque for the motor based at least partly on the motor speed and on whether the fault condition caused the three-phase short circuit or the three-phase open circuit and using the estimated motor torque to control the drive system while operating in the fault condition.

In an additional aspect, a non-transitory, computer-readable medium comprising computer-executable instructions that, when executed, causes a computing system that operates an electric vehicle (EV) during a fault condition to perform operations is disclosed. The operations performed by the computing system in response to the instructions of the non-transitory, computer-readable medium comprises running a diagnostic routine to monitor a drive system for the fault condition, the drive system comprising a motor configured to provide motive force to the EV and, based on a result of the diagnostic routine, identifying that the drive system is in the fault condition. In response to identifying that the drive system is in the fault condition, the computing system is caused, by the non-transitory, computer-readable medium, to determine a motor speed of the motor and determine whether the fault condition caused a three-phase short circuit or a three-phase open circuit. The computing system is further caused, in response to identifying that the drive system is in the fault condition, to estimate a motor torque for the motor based at least partly on the motor speed and on whether the fault condition caused the three-phase short circuit or the three-phase open circuit and use the estimated motor torque to control the drive system while operating in the fault condition.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
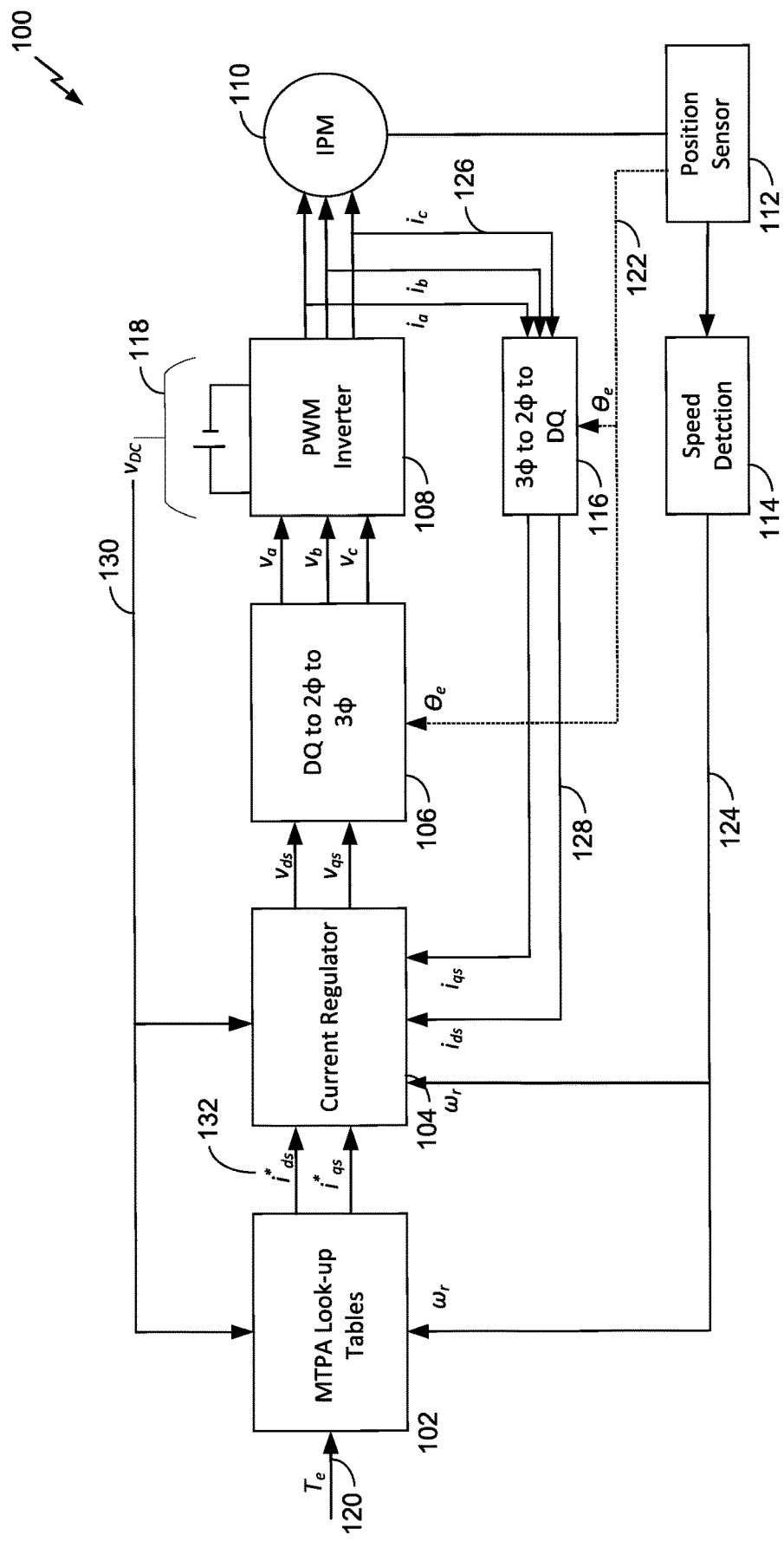
FIG. 1 shows a block diagram of an exemplary motor drive control system, such as that used in an internal permanent magnet (IPM) motor drive system.

Aspects of the present disclosure relate to diagnostic functions that monitor for fault conditions during operation of an electric vehicle. Because reactions to fault conditions in the electric vehicle may be of critical import with regard to safety of passengers, outside traffic and pedestrians, and the electric vehicle itself, improved diagnostics capable of detecting said fault conditions are desired. In some embodiments, such improved diagnostics may utilize various parameters or quantities of the electric vehicle for proper diagnostic functions and operation. For example, torque(s) being generated by the electric drive motor(s) of the electric vehicle may be useful for implementation of fault diagnostic functions and/or traction control (amongst other things). However, due to cost and/or space limitations, many electric vehicles do not include any sensors dedicated to measuring the motor torque.

Beneficially, the disclosed technology is able to monitor fault conditions without the use of such torque sensors by implementing techniques for estimating the motor torque. For example, during normal operation when no fault is present, motor torque can be estimated by certain subroutines at low speeds as described in more detail below, or may be estimated using shaft power at high speeds. During a fault condition, protective actions can be taken by the motor controller to protect the hardware (e.g., the motor and the inverter). For example, the inverter may include a number of switches, such as insulated gate bipolar transistors ("IGBT"), and the motor controller can command to open all switches (a "3-phase open"), close all upper switches (a "short high"), or close all lower switches (a "short low"), alone or in sequence. However, the torque estimation subroutines used during normal operation may not accurately estimate torque during these fault condition responses. Embodiments of the disclosed technology addresses this challenge, among others, by providing techniques to estimate the motor torque during fault conditions, as described in further detail below. In some implementations, the estimated torque may be the braking torque, which is the force required to stop the motion of the vehicle.

Example fault conditions include current sensor failure, over voltage faults, various diagnostic faults, temperature sensor faults, and faults in inverter switches. Beneficially, the disclosed technology can be used to implement safety-enhancing features for electric vehicles even in the event of these fault conditions (among others). For example, in electric vehicles having two or more motors, the disclosed technology can use the estimated torque to drive the vehicle using a second motor during a fault of the first motor. This can include driving the vehicle to a safe location before stopping the vehicle, either autonomously or by prompting the driver.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies and system configurations, some of which are illustrated by way of example in the figures and in the following description of the preferred aspects. The detailed description and drawings are merely illustrative of the disclosure rather than limiting, the scope of the disclosure being defined by the appended claims and equivalents thereof.

In electric vehicles (EVs), interior permanent magnet (IPM) electric motors may be used in various systems, including vehicle drive systems. Such motors typically include a stationary stator and a rotatable rotor placed concentrically within the stator, with the rotor comprising a magnetically permeable material used to conduct magnetic flux and a number of magnetic poles created by putting permanent magnet material into openings formed in the rotor. Although the examples of the present application focus on the use of IPMs, the disclosed torque estimation and fault condition handling technology can be implemented with other electric motors that can be used to generate motive force, including both AC motors and DC motors. Accordingly, one or more motor drive control systems may be implemented in the EV that provides control of, feedback of, and diagnostics on the electric motors.

The techniques described herein may be used for various EV, hybrid electric vehicle (HEV), or electric motors systems, EV systems, electric power generators, electric pumps, or any other electricity driven system that generates motive power where control of the driven system is critical when a fault condition involving the electric motor system occurs. The teachings herein may be incorporated into (for example, implemented within or performed by) a variety of electric motor systems.

FIG. 1 shows a block diagram of an exemplary motor drive control system, such as that used in an internal permanent magnet (IPM) motor drive system 100. The IPM motor drive system 100 shown may be representative of motor control systems used to control the IPM motor. The IPM motor drive system 100 may include various components or representative components, such as maximum torque per ampere (MTPA) lookup tables (lookup tables) 102, a current regulator 104, a 2-to-3-phase converter 106, a pulse width modulated (PWM) inverter 108, an IPM motor 110, a position sensor 112, a speed detector 114, a 3-to-2-phase converter 116, a voltage meter 118, a torque command input 120, a position feedback 122, a motor speed feedback 124, a 3-phase current feedback 126, a 2-phase current feedback 128 calculated from the 3-phase measured current values, a DC voltage measurement 130, and output current commands 132. In some embodiments, the DC voltage measurement 130 corresponds to the DC voltage bus measurement at the inverter 108. The output current commands 132 are shown in FIG. 1 having two values ($i^*_{ds}$, $i^*_{qs}$); however, for simplicity, the two values of the output current commands 132 will be referred to herein as a single output current command 132. The lookup tables 102 may correspond to lookup tables that may have the torque command input 120, the motor speed feedback 124, and the DC voltage measurement 130 as inputs and that identifies the output current command 132 based on the torque command input 120 and the motor speed feedback 124. In some embodiments, the torque command input 120 may be generated, selected, or identified using any other torque command selection means. The output current command 132 may feed the current regulator 104, which may convey a corresponding voltage to the 2-to-3-phase converter 106 based on the DC voltage measurement 130, the 2-phase current feedback 128, and the motor speed feedback 124.

The 2-to-3-phase converter 106 can convert the 2-phase voltage signal output by the current regulator 104 to a three-phase voltage signal to be fed to the PWM inverter 108, which can output a generated three-phase AC voltage to the IPM motor 110. In some embodiments, the 2-3 phase converter may convert the voltage signal output by the current regulator 104 in a synchronous frame to a 3-phase voltage signal in a stationary frame based on inverse park transformation and/or inverse Clarke transformation. In some embodiments, the PWM inverter 108 may be connected to a DC voltage bus, which may provide input power to the PWM inverter 108. The position sensor 112 can generate the position feedback 122, which the speed detector 114 can use to generate the motor speed feedback 124. The 3-to-2-phase converter can use the position feedback 122 when converting the three-phase current feedback 126 to the DQ current feedback 128, and the 2-to-3 phase converter can use the position feedback 122 when converting the DQ output voltage from the current regulator 104 to the three-phase voltage input to the PWM inverter 108. The voltage meter 118 can generate the DC voltage measurement 130 at the PWM inverter 108. The PWM inverter 108 can convert the DC voltage received (for example, from the battery) to a three-phase AC voltage that powers the IPM motor 110. The lookup tables 102 and the current regulator 104 can both use the DC voltage measurement in identifying the output current command 132 and the conversion of the output current command to output voltages, respectively. Detailed operation of the functional blocks of the IPM motor drive system 100 is known in the art, and need not be described in detail.

As described above, a processor (not shown in FIG. 1, see, e.g., processor 204 of FIG. 2) may identify the output current command 132 (for example, via the lookup tables or any other means and methodology) given the torque command input 120, the DC voltage measurement 130, the motor speed feedback 124, and/or any other parameters. The processor may select the MTPA lookup table 102 that corresponds to the DC voltage measurement 130 when the DC voltage measurement is received with the command torque input 120 and the motor speed feedback 124. However, when a lookup table is being used, there may be instances when there is no lookup table 102 corresponding exactly to the DC voltage measurement 130. For example, the DC voltage measurement 130 may be 353V and there may only be lookup tables 102 for 350V and 355V. Accordingly, the processor may calculate by interpolation the output current command 132 for the DC voltage measurement 130 based on corresponding values in the existing 350V and 355V lookup tables 102.

When interpolating the output current command 132 based on lookup tables 102 corresponding to voltages that bound the DC voltage measurement 130 ($V_{meas}$), the processor can first select the necessary lookup tables. The processor may select a first lookup table from the plurality of lookup tables 102 that bounds the $V_{meas}$ on the low side (e.g., the lookup table for a first voltage lower than the $V_{meas}$ having a lookup table) and a second lookup table that bounds the $V_{meas}$ on the high side (e.g., the lookup table for a first voltage higher than the $V_{meas}$ having a lookup table). Accordingly, for the example described above, the processor may select the first lookup table for $V_{low}$, where $V_{low}$=350V, and the second lookup table for $V_{high}$, where $V_{high}$=355V. Accordingly, $V_{low}$<$V_{meas}$<$V_{high}$. The interpolation may proceed by the processor first identifying $Id_{low}$ in the first lookup table ($V_{low}$) based on the torque command input 120 ($T_{cmd}$) and the motor speed feedback 124 ($\omega_r$), and then identifying $Id_{high}$ in the second lookup table ($V_{high}$) based on the torque command input 120 $T_{cmd}$ and motor speed feedback 124 $\omega_r$. The processor then uses Equation 1 below to interpolate the output current command 132 $Id_{meas}$ corresponding to the DC voltage measurement 130 ($V_{meas}$):

$$Id_{meas}=Id_{low}+(Id_{high}-Id_{low})*(V_{meas}-V_{low})/(V_{high}-V_{low}) \quad \text{(Equation 1)}$$

The linear interpolation described above is applicable for any situations where the torque command input 120 ($T_{cmd}$) exists in both lower and higher ($V_{low}$ and $V_{high}$, respectively) lookup tables in relation to the DV voltage measurement 130. For example, the linear interpolation described would provide accurate current outputs for DC voltage measurements 130 within a constant torque region of the IPM motor. Other interpolation methods may be implemented when linear interpolation cannot be used. In some embodiments, each IPM motor 110 may have its own IPM motor drive system 100. In some embodiments, more than one IPM motor 110 may be coupled to the IPM motor drive system 100.

Figure 2:
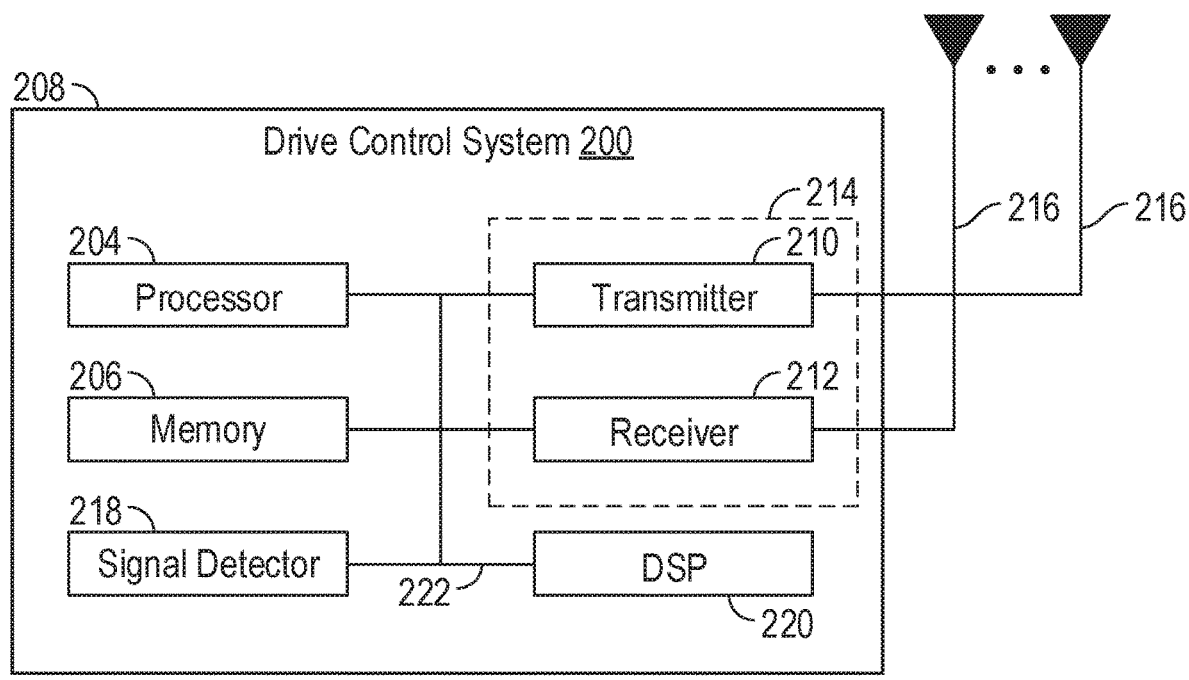
FIG. 2 illustrates various components in a drive control system that may control one or more IPM motor drive systems of FIG. 1 employed within the EV or other electric motor system, in accordance with certain embodiments described herein.

FIG. 2 illustrates various components in a drive control system 200 that may control one or more IPM motor drive systems 100 of FIG. 1 employed within the EV or other electric motor system, in accordance with certain embodiments described herein. The drive control system 200 is an example of a control system that may be configured to implement the various methods described herein. The drive control system 200 may implement the various controls used to drive and/or operate the EV.

The drive control system 200 may include a processor 204 which controls operation of the drive control system 200 (and thus the one or more IPM motor drive systems 100). The processor 204 may also be referred to as a central processing unit (CPU). In some embodiments, the processor 204 may be used to control operation of various aspects of the EV or other electric motor system. Memory 206, which may include both read-only memory (ROM) and random access memory (RAM), provides instructions and data to the processor 204. A portion of the memory 206 may also include non-volatile random access memory (NVRAM). The processor 204 may perform logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable hardware entities that can perform calculations or other manipulations of information.

The processing system may also include machine-readable media (for example, the memory 206) for storing software. Software as used herein refers to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The drive control system 200 may also include a housing 208. In some embodiments, when the drive control system 200 is distributed, the housing may include the entire device in which the drive control system 200 is implemented. For example, the housing 208 may comprise the EV when the drive control system 200 is implemented in the EV. In some embodiments the drive control system 200 may include a transmitter 210 and a receiver 212 that may allow transmission and reception of data between the drive control system 200 and a remote location and/or device. The transmitter 210 and receiver 212 may be combined into a transceiver 214. A single or a plurality of transceiver antennas 216 may be attached to, positioned internal to, or utilize the housing 208 and may be electrically coupled to the transceiver 214. The drive control system 200 may also include multiple transmitters, multiple receivers, and multiple transceivers (for example, when multiple wireless communication systems are implemented in or in conjunction with the drive control system 200).

The drive control system 200 may also include a signal detector 218 that may be used in an effort to detect and quantify the level of signals received by the transceiver 214 or any other transceiver. The signal detector 218 may detect various parameters regarding the received signals. The drive control system 200 may also include a digital signal processor (DSP) 220 for use in processing signals. In some aspects, the drive control system 200 may also include one or more of a user interface component (not shown) and one or more wireless communication modems (not shown) that provides for communications using one or more wireless technologies, such as any of the IEEE 802 protocol standards or any broadband standards. In some embodiments, the user interface of the drive control system 200 may be integrated with the user interface of the EV.

The various components of the drive control system 200 may be coupled together by a bus system 222, which may include one or more of a power bus, a control signal bus, and a status signal bus in addition to a data bus.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Additionally, additional components not illustrated in FIG. 2 may be included in any of the IPM motor drive systems 100.

Fault Condition Determination

During a normal operation state or mode of the IPM motor drive system 100, there may be no faults present or existing that relate to the operation of the IPM motor 110. In some embodiments, in such a state, a motor torque of the IPM motor 110 may be estimated based on a torque equation algorithm (which may be a preferable option at low motor speeds) or by using an estimated shaft power (which may be preferable at high motor speeds). The low and high motor speeds described herein may relate to rotational speeds generated by the IPM motor 110. In such a normal operation state, the IPM motor 110 may be driven according to various parameters, including torque, speed, feedback voltage, etc. Accordingly, the IPM motor 110 may, for example, be driven in a first direction based on one or more commands applied to the inverter 108 and thus, to the IPM motor 110. In some embodiments, the IPM motor 110 may rotate in either a forward (or positive) or reverse (or negative) direction during a fault condition.

During a fault state or mode (for example, when a fault condition related to the IPM motor 110 exists or occurs), various possible actions may exist for the IPM motor drive system 100 to take. In some embodiments, one or more of the possible actions may be taken by the inverter 108. For example, a first possible fault action by the inverter 108 may be to open all switches in the inverter 108, thereby creating an open circuit. Additionally, a second possible fault action by the inverter 108 may be to close all upper or all lower switches, thereby creating either a short high or a short low scenario, respectively. In some embodiments, the voltage meter 118 may measure a voltage of the DC bus. If the measured voltage exceeds a threshold, the voltage meter 118 (or a corresponding processor) may set an over voltage bus fault flag and trigger a fault action for the IPM drive system 100, such as a three phase short (by shorting either the high or the low switches) by the inverter 108. In some embodiments, the three-phase short may default to shorting the low switches over the high switches, or vice versa.

In some embodiments, the fault action is decided on a case-by-case basis. For example, for certain faults (for example, when a gate drive board loses 12 VDC power, and so forth), selected fault actions may include only 3-phase open fault actions. For certain other faults (for example, a resolver fault, a DC over voltage fault, and so forth), selected fault actions may only include 3-phase short fault actions. For certain additional faults (for example, a current sensor fault, and so forth), selected fault actions may include 3-phase short fault actions at high speeds and 3-phase open fault actions at low speeds. A high speed may correspond to when a BackEMF ($V_{bemf}=\omega_r\lambda_f$), which is the phase voltage of the motor, and $\sqrt{3}V_{bemf}$ are higher than the direct current voltage ($V_{dc}$). A low speed may correspond to when a BackEMF ($V_{bemf}=\omega_r\lambda_f$), which is phase voltage of the motor, and $\sqrt{3}V_{bemf}$ are lower than the direct current voltage ($V_{dc}$). During the short-open transition, hysteresis may be applied. A selection between the 3-phase open and the 3-phase short options (high or low) may be made based on a speed of the IPM motor 110. For example, the 3-phase short (high or low) may be applied at either high motor speeds or low motor speeds (respectively). In some embodiments, the 3-phase open may be applied generally at low motor speeds. In some embodiments, determining motor torque in the 3-phase short option may be more time consuming that determining the motor torque in the 3-phase open option.

Accurate motor torque values may be critical for proper handling and reaction to fault conditions. As described above, motor torque estimation algorithms or estimated shaft power values may be sufficient to estimate the motor torque values during normal, no fault, conditions and operations. However, during a fault condition, these torque estimation algorithms and/or the estimated shaft powers may not provide accurate torque values during the fault condition. Thus, the accurate torque estimation of the IPM motor 110, which may be critical for remedial control of the IPM motor drive system 100 during a fault condition in a multiple motor system, may not be determined by either the motor torque estimation algorithms or the estimated shaft power. For example, for a two motor drive system, if a first of the two motors is faulted, the second motor may still function to drive or operate the system with reduced performance if the commanded torque of the second motor is greater than the braking torque of the first faulted motor. However, in some embodiments, in order to control the second motor appropriately to compensate for the first motor, the braking torque of the first motor may be calculated and provided to the second motor as a value or torque amount that may be exceeded to overcome the fault condition of the first motor. Methods, systems, and apparatus for estimating the motor braking torque during various fault conditions are described herein.

During a fault condition, one or more components of the IPM motor drive system 100 (for example, the IPM motor 110 and/or the inverter 108, and so forth) may be at risk of damage or improper operation. Accordingly, when a fault occurs, the processor 204 of the IPM motor drive system 100 may perform a corrective action to protect the drive system components. In some embodiments, a first corrective action performed by the processor 204 may be to command all switches (for example, insulated-gate bipolar transistors (IGBTs)) of the inverter 108 to open, thereby creating a 3-phase open at the inverter 108. In some embodiments, a second corrective action performed by the processor 204 may be to command all upper or all lower switches (IGBTs) to close, thereby creating a 3-phase short (high or low, respectively) at the inverter 108. In some embodiments, both of these corrective actions may be performed in sequence, dependent on the operating conditions of the IPM motors 110 and the fault(s) that occurs. A selection of which (or both) of the corrective actions to perform may depend entirely on a type of the fault that occurs and the operating conditions of the motors when the fault occurs. In some embodiments, the selection of the corrective actions to perform may depend, at least in part, on the speed of the IPM motor 110.

Motor Torque Estimation

When the fault condition results in the 3-phase short (high or low speed) at the inverter 108, the processor 204 may determine a steady state motor torque based on Equation 2 below:

$$T_{qbk} = -\frac{3}{2} n_p R_s \lambda_f \frac{\omega_e (R_s^2 + \omega_e^2 L_q^2)}{(R_s^2 + \omega_e^2 L_d L_q)^2},$$ (Equation 2)

where:
- $T_{qbk}$ is the steady state motor torque for the IPM motor 110;
- $n_p$ is the number of pole pairs for the IPM motor 110;
- $R_s$ is the stator resistance of one phase of the IPM motor 110;
- $\lambda_f$ is the rotor flux constant;
- $\omega_e$ is the electrical fundamental frequency; and
- $L_d$ and $L_q$ are the dynamic d and q-axis inductances, respectively.

In some embodiments, each of these parameters (with the exception of the fundamental frequency $\omega_e$) may be known and/or available to the processor 204. With regard to the fundamental frequency $\omega_e$, the processor 204 may determine the fundamental frequency $\omega_e$ based on one or more of a speed measurement of the IPM motor 110, a current measurement of the IPM motor 110, a wheel speed of the EV, and a vehicle speed of the EV. Accordingly, in some embodiments, the braking torque for the 3-phase short may be a function of the electrical motor speed and various machine parameters.

Furthermore, in some embodiments, some of the various machine parameters, for example the rotor resistance $R_s$ and the rotor flux $\lambda_f$, may be a function of a temperature ($T_{mot}$, for example, an operating temperature) of the IPM motor 110, as depicted by Equations 3 and 4 below:

$$R_s = f(T_{mot})$$ (Equation 3)

$$\lambda_f = f(T_{mot})$$ (Equation 4)

Based on Equations 2-4, in some embodiments, the 3-phase short braking torque may be predetermined and stored in a two-dimensional (2D) lookup table. Alternatively, in some embodiments the 3-phase short braking torque may be calculated on demand based on Equations 2-4 discussed herein.

As discussed herein, in some embodiments, operational parameters of the IPM motor 110 (for example, the $R_s$ and $\lambda_f$) may be dependent, at least in part, on a temperature of the IPM motor 110. For example, as the IPM motor 110 increases in temperature during operation, values the various operational parameters of the IPM motor 110 may change as compared to when the IPM motor 110 operates at a cold temperature. For example, a torque generated by the IPM motor 110 at a particular motor speed may change or fluctuate as the operational temperature of the IPM motor 110 changes. Additionally, resistances and/or flux constants of the IPM motor 110 may change as a function of the operational temperature of the IPM motor 110. An example of the temperature dependent operational parameters of the IPM motor 110 is provided in FIG. 3.

When the fault condition results in the 3-phase open at the inverter 108, the braking torque of the IPM motor 110 may only be generated by the IPM motor 110 when the voltage generated by the IPM motor 110 is greater than the DC ling voltage, thus placing the IPM motor 110 is an uncontrolled regeneration state. When these conditions are met and the IPM motor 110 is generating a braking torque, the braking torque may be estimated, in some embodiments, based on an estimated shaft power obtained from Equations 5-8 below:

$$T = P_{shaft}/\omega_r$$ (Equation 5)

$$P_{shaft} = P_{dc} - P_{loss}$$ (Equation 6)

$$P_{dc} = v_{dc} i_{dc}$$ (Equation 7)

$$P_{loss} = P_{inv} + P_{mot}$$ (Equation 8)

Where:
- T is the estimated torque of the IPM motor 110;
- $P_{shaft}$ is the estimated shaft power generated by the IPM motor 110;
- $\omega_r$ is the motor speed;
- $P_{dc}$ is the DC power of the IPM motor 110;
- $P_{loss}$ is the total power loss;
- $v_{dc}$ is the DC voltage fed to the inverter 108;
- $i_{dc}$ is the DC current fed to the inverter 108;
- $P_{inv}$ is the power loss attributable to the invertor 108; and
- $P_{mot}$ is the power loss attributable to the IPM motor 110.

As shown, the DC power (Pdc) may be calculated based on measured DC voltage and current of the IPM motor 110. By accounting for power losses (Ploss) introduced by the inverter 108 and the IPM motor 110, the power of the shaft (Pshaft) may be determined from the DC power (Pdc). The shaft power (Pshaft) is related to the torque output (T) by the IPM motor 110 based on the motor speed ($\omega_r$) of the IPM motor 110. Thus, an estimated torque (T) of the IPM motor 110 may be determined in a 3-phase open fault response. In some embodiments, the total power losses (Ploss) may not be dynamically calculated and may instead be stored in a lookup table based on motor speed ($\omega_r$) and motor phase current. For example, total power losses at various motor speeds and currents may be measured during design and/or manufacturing of the EV and stored in the lookup table for use during operation. In some embodiments, the power losses may be dynamically calculated during operation of the EV (for example, by the processor 204 or another component). In some embodiments, the DC current (idc) may not be measured. In such cases, the DC current may be estimated based on Equation 9 below:

$$I_{dc}=I_a(\text{if } I_a<0)+I_b(\text{if } I_b<0)+I_c(\text{if } I_c<0) \quad \text{(Equation 9)}$$

Where:
Ia, Ib, and Ic are currents for each of the three phases fed to the IPM motor 110.

Figure 3:
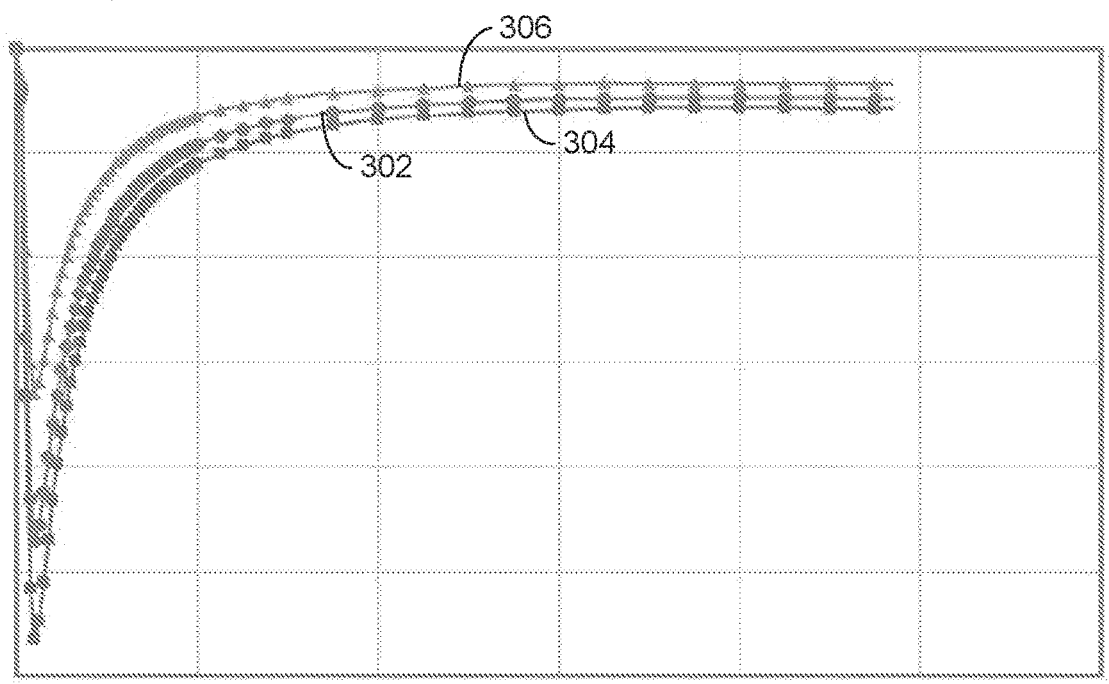
FIG. 3 illustrates a graph correlating 3-phase short braking torque as a function of motor speed at different temperatures, in accordance with certain embodiments described herein.

FIG. 3 illustrates a graph 300 depicting 3-phase short braking torque as a function of motor speed at different temperatures, in accordance with certain embodiments described herein. The graph 300 shows the short braking torque along the y-axis and the motor speed (in rotations per minute (RPM)) along the x-axis. The graph 300 also includes three curves, each representing torque measurements at a particular temperature. Curve 302 represents torque measurements at a nominal IPM motor operating temperature. Curve 304 represents torque measurements at an operating temperature that is lower than the nominal IPM motor operating temperature. Curve 306 represents torque measurements at an operating temperature that is higher than the nominal IPM motor operating temperature. Each of the curves 302-306 generally show the braking torque of the IPM motor 110 following the same pattern including a sharp spike of negative torque that, once a maximum negative torque is reached, sharply increases before gradually levelling out at a level value as the torque approaches zero. As shown, the change in operating temperature of the IPM motor 110 may change the maximum negative torque values and the level values at which the curves 302-306 level out at as the torque approaches zero.

During the period shown in the graph 300, the IPM motor 110 may generate braking torque. During this period, the IPM motor 110 may consume all energy, for example through stator winding and the rotor core of the IPM motor 110. In some embodiments, the IPM motor 110 may operate as a brake when exposed to the negative torque shown in the graph 300. In some embodiments (not shown in the graph 300), the IPM motor 110 may operate as a generator, which may create a fault condition where the corrective action taken is a three-phase open.

The motor temperature (for example, represented by $T_{mot}$) may be obtained using a thermistor or other temperature measurement device. In some embodiments, the temperature $T_{mot}$ may be obtained by measuring a temperature of a coolant used to maintain the temperature of the IPM motor 110. The curves 302-306 shown in FIG. 3 may not related to any particular IPM or electric motor.

Based on the graph 300, a process may be implemented to obtain 3-phase braking torque at various motor speeds and motor temperatures in a predetermined manner for storage in a memory or other storage as a 2D lookup table. In some embodiments, the process for determining and storing the 3-phase braking torque at various motor speeds and motor temperatures in the 2D lookup table may include various steps, as shown in the representative method of FIG. 4.

Figure 4:
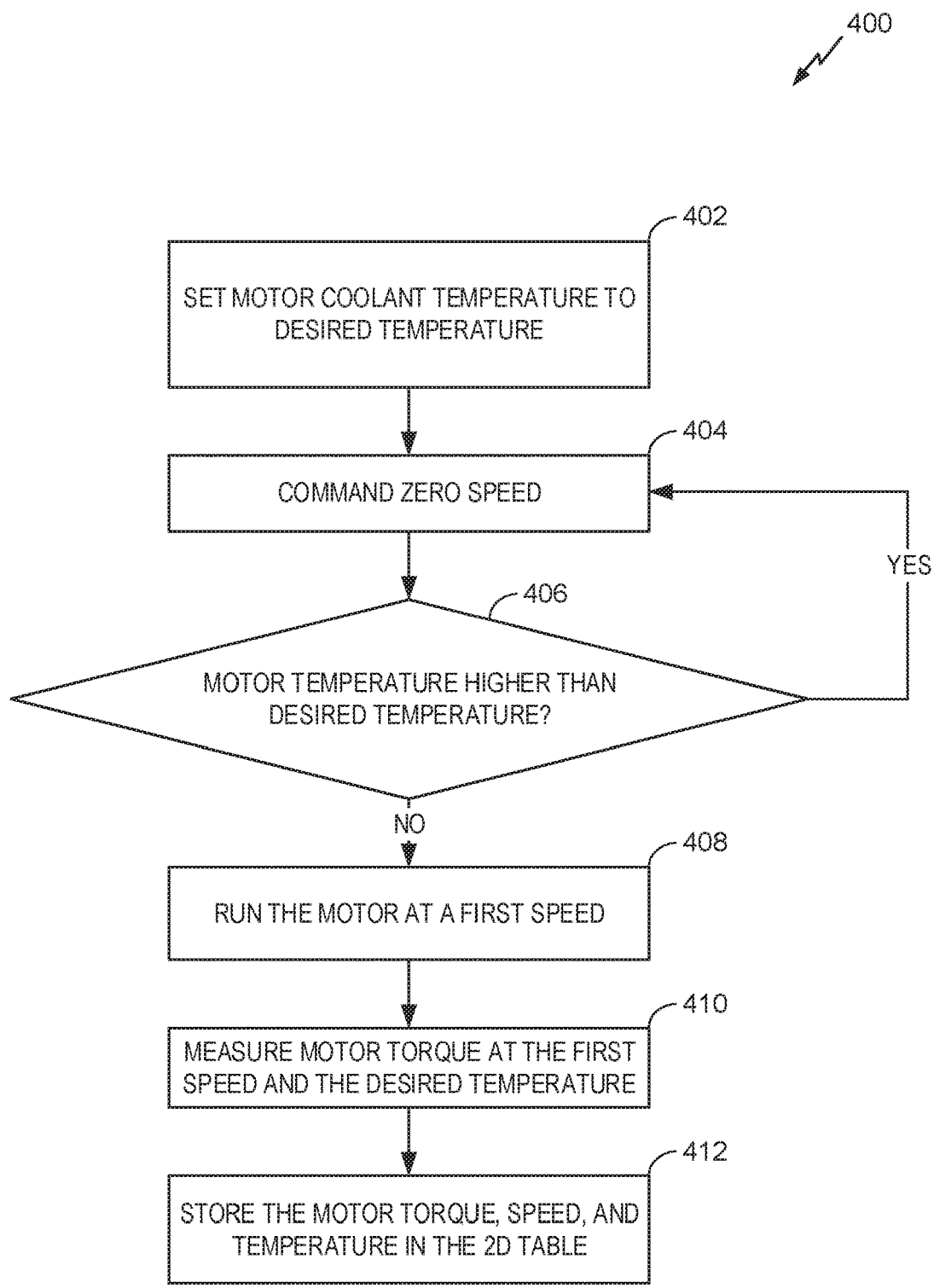
FIG. 4 illustrates a flowchart of a method of identifying a 3-phase braking torque at one motor speed and motor temperature for storage in a 2D lookup table, in accordance with certain embodiments described herein.

FIG. 4 illustrates a flowchart of a method 400 of identifying a 3-phase braking torque at one motor speed and motor temperature for storage in a lookup table such as the MTPA lookup tables 102, in accordance with certain embodiments described herein. In some embodiments, the various blocks shown in the method 400 may be performed as part of an automated process that may be applied to each EV. Accordingly, one or more of the blocks shown in method 400 may be performed by the processor 204 of FIG. 2. In some embodiments, the method 400 may be performed by an external system during design and implementation of the IPM motor drive system 100. In some embodiments, one or more of the blocks shown may be omitted from or additional blocks may be added to the method 400 shown. In some embodiments, one or more blocks of the method 400 may be performed by other components of the IPM motor drive system 100.

At block 402, the IPM motor 110 operational temperature may be set to a desired threshold or limit. In some embodiments, setting the operational temperature of the IPM motor 110 may involve setting the motor coolant to maintain the IPM motor 110 at the desired temperature. In some embodiments, setting the IPM motor 110 operational temperature may comprise establishing a maximum temperature that the environment (for example, the coolant, and so forth) will allow the IPM motor 110 to reach. In some embodiments, setting the IPM motor 110 operation temperature may comprise establishing a temperature range within which the temperature of the IPM motor 110 is to be maintained. Once the maximum desired temperature of the IPM motor 110 is set, the method 400 proceeds to block 404.

At block 404, the motor speed for the IPM motor 110 is commanded to a value of zero RPM. In some embodiments, setting the motor speed to zero RPM may effectively turn off or shutdown the IPM motor 110. Once the speed of the IPM motor 110 is commanded to zero, the method 400 proceeds to block 406.

At block 406, the temperature of the IPM motor 110 is checked against the desired temperature threshold established above at block 402. In some embodiments, the temperature of the IPM motor 110 is checked against the desired temperature range established at block 402. In some embodiments, if the temperature of the IPM motor 110 exceeds the desired temperature or the desired temperature range set in block 402, the method 400 proceeds to block 404, where the IPM motor 110 is commanded or set to zero speed before the motor temperature is again checked at block 406. In some embodiments, if the temperature of the IPM motor 110 does not exceed the desired temperature set in block 402, the method 400 proceeds to block 408.

At block 408, the IPM motor 110 is run at a desired speed. In some embodiments, the desired speed may be a desired rotational speed or a fundamental frequency of the IPM motor 110. In some embodiments, once the IPM motor 110 is operating at the desired speed, the method 400 proceeds to block 410.

At block 410, the processor 204 (or external system) measures a motor torque of the IPM motor 110. In some embodiments, the motor torque may be measured via any known torque measuring device for electric motors. In some embodiments, the motor torque may be calculated based on the Equations 2-4 described herein. In some embodiments, once the IPM motor 110 motor torque is measured, the method 400 proceeds to block 412.

At block 412, the processor 204 (or external system) stores various data in the memory 206 (FIG. 2). For example, in some embodiments, the data is stored in a 2D lookup table. In some embodiments, the motor torque of the IPM motor 110 is stored in relation to or as a function of the motor speed and the motor temperature of the IPM motor 110.

In some embodiments, the method 400 may be repeated for various temperature settings in block 402 and various speed settings in block 408. By repeating the method 400 at different temperatures and speeds, the lookup table may be generated to include all, a majority of, or many of the potential values that the IPM motor 110 may experience in common use. In some embodiments, by creating this lookup table, reduced computations are required by the EV and the IPM motor drive system 100 during operation of the EV. In some embodiments, the lookup table may not be generated for each individual IPM motor 110 used, but rather a general lookup table with these values may be used for all IPM motors 110 used in similar use cases and implementations. In some embodiments, each individual IPM motor 110 will be processed using the method 400 to generate a specific lookup table for the IPM motor 110.

Figure 5:
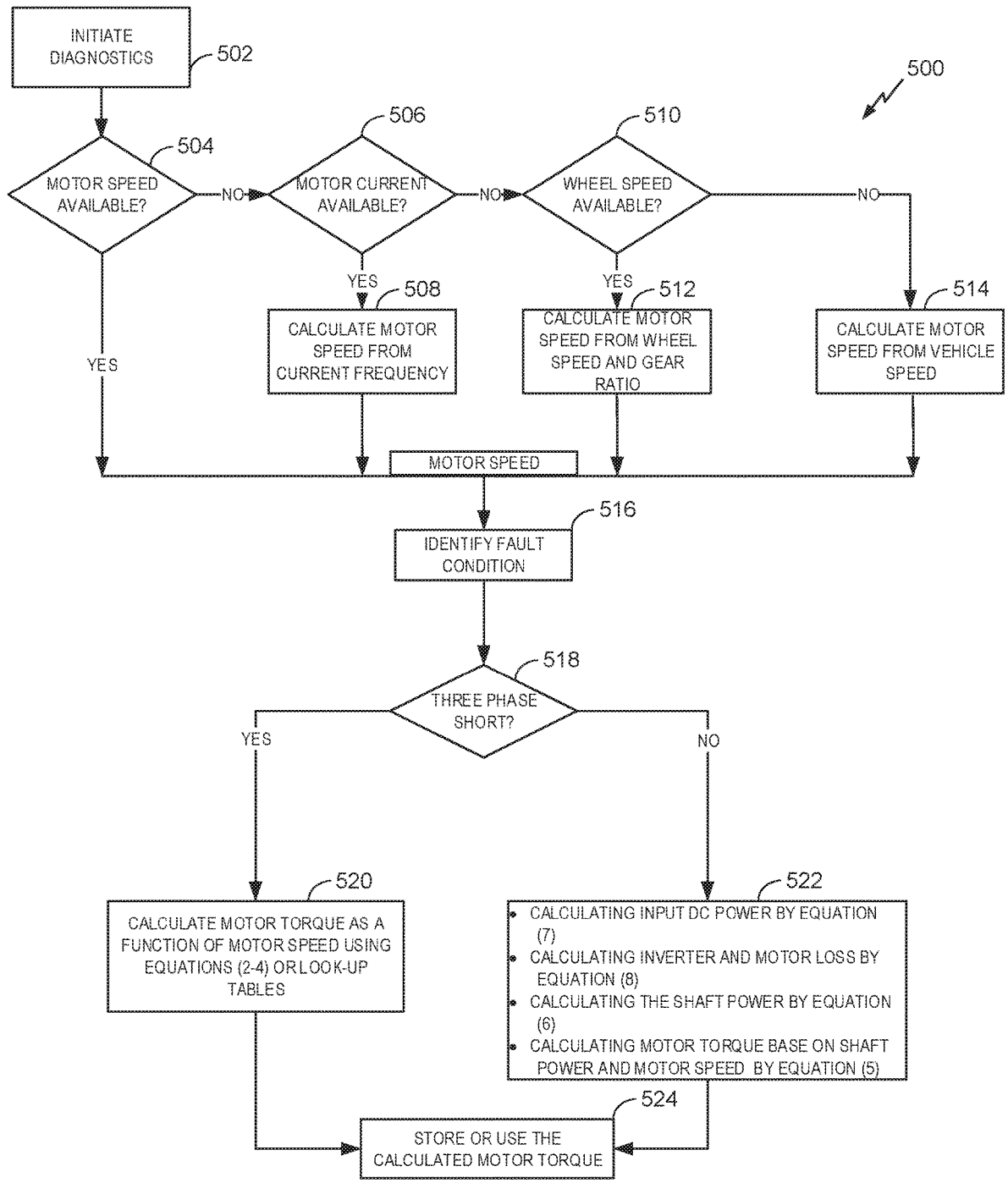
FIG. 5 illustrates a flowchart for estimating torque during a fault condition, in accordance with certain embodiments described herein.

FIG. 5 illustrates a flowchart for a method 500 of estimating torque of the IPM motor 110 during a fault condition, in accordance with certain embodiments described herein. In some embodiments, the various blocks shown in the method 500 may be performed as part of an automated process that may be applied to each EV. According, one or more of the blocks shown in method 500 may be performed by the processor 204 of FIG. 2. In some embodiments, the method 500 may be performed by an external system during operation of the IPM motor drive system 100. In some embodiments, one or more of the blocks shown may be omitted from or additional blocks may be added to the method 500 shown. In some embodiments, one or more blocks of the method 500 may be performed by other components of the IPM motor drive system 100.

At block 502, a diagnostic may be run or initiated. In some embodiments, the diagnostic run at block 502 may be run in the background while the IPM motor drive system 100 is operating to drive the EV. In some embodiments, the diagnostic may be operating in the background during all operations of the EV. In some embodiments, the diagnostic run in block 502 may be run only when the IPM motors 110 are being used to move the EV. When the diagnostic is running, the method 500 proceeds to block 504.

At block 504, the motor speed is determined to be available or not available. In some embodiments, the IPM motors 110 may include one or more sensors or indicators that measure or provide the motor speed of the IPM motor 110 while they are in operation or idle. For example, the one or more sensors or indicators may comprise a resolver or decoder. In some embodiments, the motor speed may comprise a rotational or a feedback speed of the IPM motor 110. In some embodiments, the motor speed may be determined based on a lookup table or other methods, as described herein. In block 504, when the motor speed is available, the motor speed measurement is available and valid. For example, when motor speed sensor diagnostics diagnose the one or more sensors as providing bad measurements, then the motor speed may not be available at block 504.

If the motor speed is determined to be available, then the method 500 proceeds to block 516 based on the motor speed being accessible, for example, to the processor 204 (FIG. 2). In some embodiments, the motor speed may be stored (temporarily or permanently) in the memory 206 (FIG. 2). If the motor speed is determined to not be readily available (for example, is determined to not be available from a speed sensor, and so forth), then the method 500 proceeds to block 506.

At block 506, the motor current is determined to be available or not available. In some embodiments, the IPM motors 110 may include current sensors (for example, AC current sensors). In some embodiments, the motor current may include single- or three-phase AC current. If AC currents are available, then the method 500 proceeds to block 508. If AC currents are not available, then the method 500 proceeds to block 510.

At block 508, the motor current may be used to calculate the motor speed. Some embodiments may wait at least half fundamental cycle to perform this calculation. In some embodiments, a phase current is sinusoidal with a fundamental frequency $\omega_e$, which is an electrical frequency. A fundamental period is needed to calculate the fundamental frequency $\omega_e$ from a current. If the sampling frequency ($f_s$) is known (for example, a 20 khz sampling frequency), a number of sample counts (Cnts) between the phase currents passing zero can be used to calculate the fundamental period, which is equal to $f_s/(2*Cnts)$. Accordingly, at least half of the fundamental cycle/period is required to obtain the speed frequency.

In some embodiments, the processor 204 may calculate the motor speed based on the motor current. In some embodiments, additional information may be used in calculating the motor speed based on the motor current. Once the motor speed is calculated based on the motor current, the method 500 proceeds to block 516. In some embodiments, the calculated motor speed may be stored (temporarily or permanently) in the memory 206.

At block 510, a wheel speed of the EV driven by the IPM motor 110 in question may be determined to be available or not available. In some embodiments, the wheel speed may be available from a dedicated sensor or measurement. In some embodiments, the wheel speed may be determined based on one or more other available measurements. If the wheel speed is available to the processor 204, then the method 500 may proceed to block 512. If the wheel speed is not available to the processor 204, then the method 500 may proceed to block 514.

At block 512, the motor speed for the IPM motor 110 may be determined or calculated based on the wheel speed. In some embodiments, the processor 204 may determine the motor speed based on the wheel speed and a gear ratio that may exist between the wheel of the EV and the IPM motor 110. In some embodiments, once the motor speed of the IPM motor 110 is determined or calculated, the method 500 may proceed to block 516. In some embodiments, the calculated motor speed may be stored (temporarily or permanently) in the memory 206.

At block 514, the motor speed for the IPM motor 110 may be determined or calculated based on the speed of the EV. In some embodiments, the processor 204 may determine the motor speed based on the EV speed. The EV speed can be used to calculate the wheel speed and a gear ratio that may exist between the wheel and the IPM motor 110. In some embodiments, once the motor speed of the IPM motor 110 is determined or calculated, the method 500 may proceed to block 516. In some embodiments, the calculated motor speed may be stored (temporarily or permanently) in the memory 206.

At block 516, a fault condition (or occurrence) is identified or detected. In some embodiments, the fault condition may be identified or detected by one or more sensors or components of the IPM motor drive system 100. In some embodiments, the fault condition may be identified or detected by the processor 204 or the inverter 108. In some embodiments, identifying or detecting the fault condition may comprise determining that one or more of the motor speed, the motor current, the wheel speed, or the vehicle speed rapidly changed with no controlled cause. In some embodiments, the fault condition may be identified or detected based on monitoring one or more diagnostic, alarm, or fault systems. In some embodiments, once the fault condition is identified, the method 500 proceeds to block 518.

At block 518, the fault condition is determined to be either a 3-phase short (high or low) fault or a 3-phase open fault. In some embodiments, the determination as to whether the fault condition is the 3-phase short or the 3-phase open is made based on the reaction of the inverter 108. As noted herein, the inverter may close all high or low IGBTs during the 3-phase short and may open all IGBTs during the 3-phase open. In some embodiments, when the fault condition is determined to be the 3-phase short fault, the method 500 proceeds to block 520. In some embodiments, when the fault condition is determined to be the 3-phase open fault, the method 500 proceeds to block 522. In some embodiments, if a determination cannot be made, the method 500 implements a 3-phase short and proceeds to block 520.

At block 520, the motor torque during the fault condition may be determined as a function of the motor speed (as determined in one of blocks 504-514) based on the Equations 3-5 herein or based on one or more lookup tables including motor torque as a function of motor speed and temperature, as discussed herein. In some embodiments, the processor 204 may calculate or lookup the motor torque based on the inputs (including motor temperature and the inputs of Equations 2-4. In some embodiments, the calculated motor torque may be used by the processor 204 to control another IPM motor 110 to compensate for the fault condition or stored in the memory 206.

At block 522, the motor torque may be calculated based on shaft power and motor speed using Equation 5 herein and based on a determination of the shaft power using Equations 6-8. For example, the processor 204 may calculate input DC power based on Equation 7 and calculate power losses based on Equation 8 before calculating the shaft power based on Equation 6 and the final motor torque based on Equation 5. In some embodiments, the calculated motor torque may be used by the processor 204 to control another IPM motor 110 to compensate for the fault condition or stored in the memory 206.

At block 524, the processor causes storage of the calculated motor torque and/or outputs the motor torque for use. As an example, the drive control system 200 can use the motor torque to continue operation of the EV during the fault condition, such as by operating a secondary motor of the vehicle to compensate for the faulted motor to drive the EV to a safe location (e.g., pulling over to an unobstructed area off the road). More generally, the calculated motor torque can be used to trigger and/or identify a fault-compensation operation mode for continued safe operation of the EV during the fault.

In some embodiments, a fault condition may be created when the EV is towed. For example, when a permanent motor, such as an IPM, is used to drive the EV and that EV is towed without disconnecting the permanent motor from a driven wheel, if that wheel spins while the EV is towed, then the permanent motor may generate power and braking torque. Thus, if the EV breaks down and all the permanent motors used to drive the EV are in a fault condition, a towing vehicle may determine a torque required to overcome the braking torque generated from the permanent motors using the processes described herein.

Other Considerations

It should be understood that any reference to an element herein using a designation such as "first," "second," and so forth does not generally limit the quantity or order of those elements. Rather, these designations can be used herein as a convenient wireless device of distinguishing between two or more elements or instances of an element. Thus, a reference to first and second elements does not mean that only two elements can be employed there or that the first element can precede the second element in some manner. Also, unless stated otherwise a set of elements can include one or more elements.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. An apparatus for operation of an electric vehicle (EV) during a fault condition, the apparatus comprising:
    a drive system comprising a motor configured to provide motive force to the EV; and
    a processing system configured to:
        run a diagnostic routine to monitor the drive system for the fault condition,
        based on a result of the diagnostic routine, identify that the drive system is in the fault condition, and
        in response to identifying that the drive system is in the fault condition:
            determine a motor speed of the motor that caused the fault condition,
            determine whether the fault condition caused a three-phase short circuit or a three-phase open circuit,
            estimate a motor torque for the motor that caused the fault condition based at least partly on the motor speed and on whether the fault condition caused the three-phase short circuit or the three-phase open circuit, and
            use the estimated motor torque to control the drive system to provide motive force to the EV while operating in the fault condition.

2. The apparatus of claim 1, wherein the processing system is configured to determine the motor speed based on a receipt of the motor speed from a motor speed input.

3. The apparatus of claim 1, wherein the processing system is configured to:
    determine that the motor speed is not available;
    determine that a motor current value is available; and
    calculate the motor speed based on a frequency of the motor current value.

4. The apparatus of claim 1, wherein the processing system is configured to:
    determine that the motor speed is not available;
    determine that a wheel speed value is available; and
    calculate the motor speed based on the wheel speed value and a gear ratio.

5. The apparatus of claim 1, wherein the processing system is configured to:
    determine that the motor speed is not available;
    determine that a motor current input value is not available;
    determine that a wheel speed value is not available; and
    in response to determining that the motor speed, motor current input value, and wheel speed value are not available, calculate the motor speed based on a speed of the EV.

6. The apparatus of claim 1, wherein the processor is configured to, in response to determining that the fault condition caused the three-phase short circuit, estimate the motor torque by accessing a value of the motor torque in a lookup table stored in a memory, wherein the value of the motor torque corresponds to the motor speed in the lookup table.

7. The apparatus of claim 6, wherein the lookup table comprises the motor torque value indexed by the motor speed and a temperature of the motor.

8. The apparatus of claim 1, wherein the processor is configured to, in response to determining that the fault condition caused the three-phase short circuit, estimate the motor torque according to $$T_{qbk} = -\frac{3}{2}n_p R_s \lambda_f \frac{\omega_e(R_s^2 + \omega_e^2 L_q^2)}{(R_s^2 + \omega_e^2 L_d L_q)^2},$$

wherein $T_{qbk}$ is the calculated motor torque for the motor, $n_p$ is a number of pole pairs of the motor, $R_s$ is a stator resistance of one phase of the motor, $\lambda_f$ is a rotor flux constant for a rotor of the motor, $\omega_e$ is an electrical fundamental frequency of the motor; and $L_d$ and $L_q$ are dynamic d and q-axis inductances of the motor, respectively.

9. The apparatus of claim 8, wherein a value of the stator resistance $R_s$ is determined based on a temperature of the motor.

10. The apparatus of claim 8, wherein a value of the rotor flux constant $\lambda_f$ is determined based on a temperature of the motor.

11. The apparatus of claim 1, wherein the processor is configured to the processor is configured to, in response to determining that the fault condition caused the three-phase open circuit, estimate the motor torque according to $T=P_{shaft}/\omega_r$, wherein T is the calculated motor torque of the motor, $P_{shaft}$ is an estimated shaft power generated by the motor, and $\omega_r$ is the calculated motor speed.

12. A method of operating an electric vehicle (EV) during a fault condition, the method comprising:
running a diagnostic routine to monitor a drive system for the fault condition, the drive system comprising a motor configured to provide motive force to the EV;
based on a result of the diagnostic routine, identifying that the drive system is in the fault condition, and
in response to identifying that the drive system is in the fault condition:
determining a motor speed of the motor,
determining whether the fault condition caused a three-phase short circuit or a three-phase open circuit,
estimating a motor torque for the motor based at least partly on the motor speed and on whether the fault condition caused the three-phase short circuit or the three-phase open circuit, and
using the estimated motor torque to control the drive system while operating in the fault condition.

13. The method of claim 12, further comprising determining the motor speed based on a receipt of the motor speed from a motor speed input.

14. The method of claim 12, further comprising:
determining that the motor speed is not available;
determining that a motor current value is available; and
calculating the motor speed based on a frequency of the motor current value.

15. The method of claim 12, further comprising:
determining that the motor speed is not available;
determining that a wheel speed value is available; and
calculating the motor speed based on the wheel speed value and a gear ratio.

16. The method of claim 12, further comprising:
determining that the motor speed is not available;
determining that a motor current input value is not available;
determining that a wheel speed value is not available; and
in response to determining that the motor speed, the motor current input value, and the wheel speed value are not available, calculating the motor speed based on a speed of the EV.

17. A non-transitory, computer-readable medium comprising computer-executable instructions that, when executed, cause a computing system that operates an electric vehicle (EV) during a fault condition to perform operations comprising:
running a diagnostic routine to monitor a drive system for the fault condition, the drive system comprising a motor configured to provide motive force to the EV;
based on a result of the diagnostic routine, identifying that the drive system is in the fault condition; and
in response to identifying that the drive system is in the fault condition:
determining a motor speed of the motor,
determining whether the fault condition caused a three-phase short circuit or a three-phase open circuit,
estimating a motor torque for the motor based at least partly on the motor speed and on whether the fault condition caused the three-phase short circuit or the three-phase open circuit, and
using the estimated motor torque to control the drive system while operating in the fault condition.

18. The non-transitory, computer-readable medium comprising computer-executable instructions of claim 17, the operations further comprising:
determining that the motor speed is not available;
determining that a motor current value is available; and
calculating the motor speed based on a frequency of the motor current value.

19. The non-transitory, computer-readable medium comprising computer-executable instructions of claim 17, the operations further comprising:
determining that the motor speed is not available;
determining that a wheel speed value is available; and
calculating the motor speed based on the wheel speed value and a gear ratio.

20. The non-transitory, computer-readable medium comprising computer-executable instructions of claim 17, the operations further comprising:
determining that the motor speed is not available;
determining that a motor current input value is not available;
determining that a wheel speed value is not available; and
in response to determining that the motor speed, the motor current input value, and the wheel speed value are not available, calculating the motor speed based on a speed of the EV.

* * * * *